United States Patent [19]
Courjon et al.

[11] Patent Number: 5,539,197
[45] Date of Patent: Jul. 23, 1996

[54] SCANNING NEAR-FIELD OPTICAL MICROSCOPE HAVING A MEDIUM DENSER THAN AIR IN THE GAP BETWEEN THE PROBE CHIP AND THE SAMPLE BEING MEASURED

[75] Inventors: Daniel Courjon, Besancon Cedex, France; Wolfgang D. Pohl, Adliswil, Switzerland

[73] Assignee: International Business Machines Corporation, Armonk, N.Y.

[21] Appl. No.: 128,458

[22] Filed: Sep. 29, 1993

[30] Foreign Application Priority Data

Oct. 22, 1992 [EP] European Pat. Off. ............. 92810813

[51] Int. Cl.⁶ .................................................. H01J 3/14
[52] U.S. Cl. .................................. 250/216; 250/306
[58] Field of Search .......................... 250/216, 307, 250/306, 492.2, 304; 359/894

[56] References Cited

U.S. PATENT DOCUMENTS 4,604,520  8/1986  Pohl ............................ 250/216
5,202,004  4/1993  Kwak et al. ..................... 250/307

Primary Examiner—Edward P. Westin
Assistant Examiner—Que T. Le
Attorney, Agent, or Firm—Daniel P. Morris

[57] ABSTRACT

This scanning near-field optical microscope is of the type where a light beam (19) with a diameter of at maximum $\lambda/20$ is emitted, or received, by a sharply pointed probe tip (13) which is scanned across the surface of a sample (11) to be investigated. The light reflected by, and/or transmitted through, the sample (11) is detected by a detector (16) and/or further processed by a computer (24). The distance between the light-emitting probe tip (13) and the sample (11) under investigation is on the order of $\lambda/20$ as well, so that the surface of the sample (11) is within the near-field of said probe tip (13). This optical microscope is characterized in that the gap between the probe tip (13) and the sample (11) is filled with a liquid (40) of high opacity, including any liquids with a large negative dielectric constant $\epsilon$, so as to attenuate the intensity of the lightwaves emitted or received by the probe tip (13) to such an extent that the penetration depth $z_0$ of the lightwaves inside the liquid, defined as the distance over which their intensity decreases to 1/e, is below 100 nm.

13 Claims, 4 Drawing Sheets

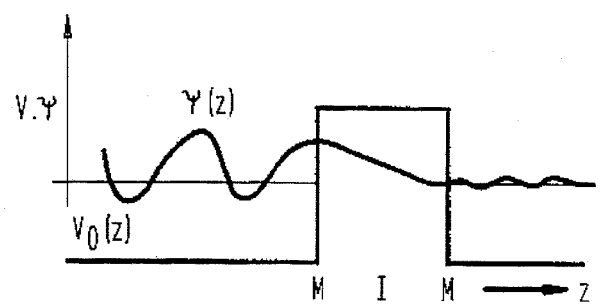
FIG. 1
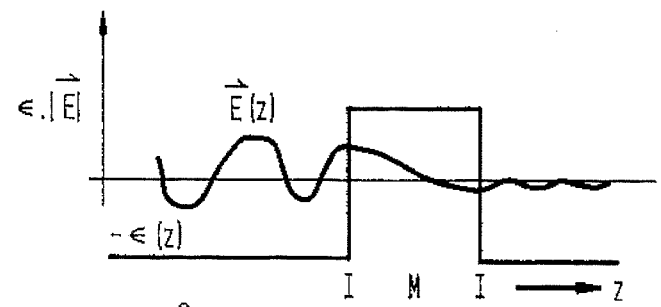
FIG. 2
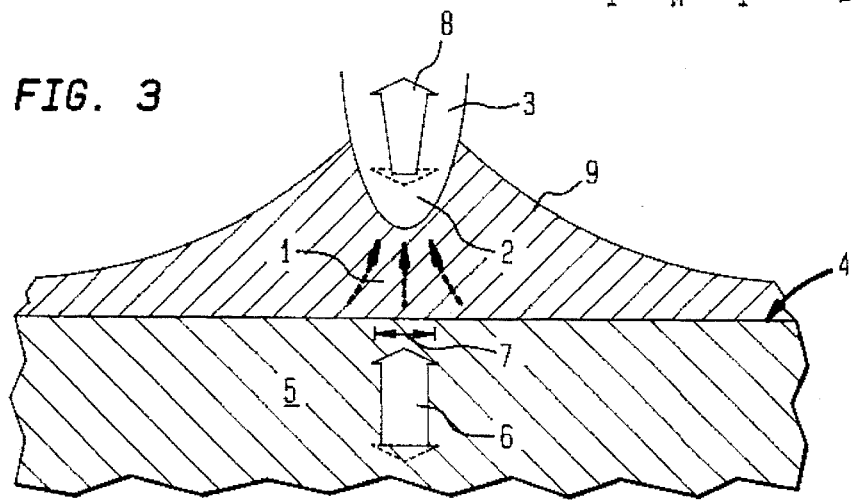
FIG. 3
FIG. 4    FIG. 5    FIG. 6
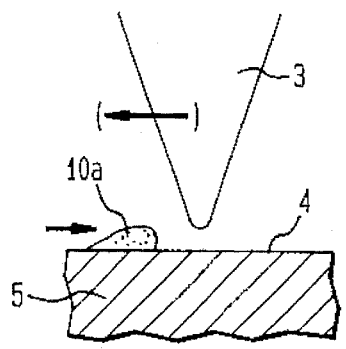
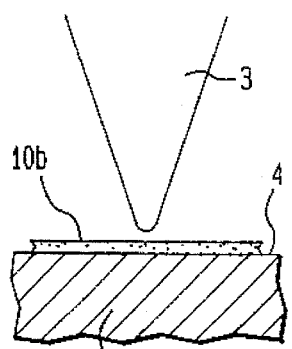
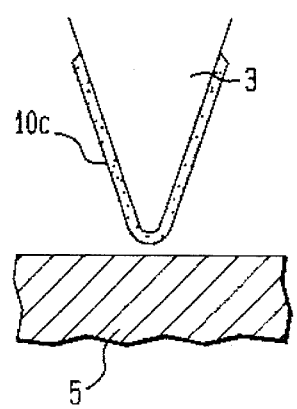

SCANNING NEAR-FIELD OPTICAL MICROSCOPE HAVING A MEDIUM DENSER THAN AIR IN THE GAP BETWEEN THE PROBE CHIP AND THE SAMPLE BEING MEASURED

DESCRIPTION

This invention relates to scanning near-field optical microscopes of the type where a light spot with a diameter of about $\lambda/20$ is scanned across a surface, or is selected by a narrow aperture, and where the reflected (or transmitted) light is recorded and/or further processed, the distance between the light-emitting, or light-receiving probe, and the surface under investigation being on the order of $\lambda/20$ as well, i.e., within the so-called near-field.

Near-field optical microscopes are well known in the art. A first more theoretical proposal was already made by E. A. Synge, *A Suggested Method for Extending Microscopic Resolution into the Ultra-Microscopic Region*, Phil. Mag. 6 (1928) p. 356–362. Later, J. A. O'Keefe, *Resolving Power of Visible Light*, J. Opt. Soc. Am., Vol. 46, No. 5, May 1956, p. 359, pointed out that the realization of the proposal was rather remote in view of the -at the time- still unresolved difficulty of providing scanning motion over the minute distance involved. Yet the basic idea was further pursued as evidenced by the paper by E. A. Ash and G. Nicholls, *Super-resolution Aperture Scanning Microscope*, Nature, Vol. 237, No. 5357, June 30, 1972, pp. 510–515.

All of these proposals used a pinhole in a thin membrane as the aperture. The requirement to place the surface to be inspected at a distance from the membrane that is approximately equal to the diameter of the aperture implied the limitation that only objects could be inspected that would have a surface flatness significantly better than an optical wavelength.

The first practical realization of a scanning near-field optical microscope was reported by W. D. Pohl in EP-A-0 112 401 (1982). Here the aperture is implemented as a sharply pointed optically transparent body covered with an opaque layer into which an opening is formed at the apex of the body, the opening having a diameter small compared to the wavelength of the light used.

For the sake of information, the following papers are made of reference, all relating to theoretical and/or practical details of the present state of the art of near-field optical microscopy:

U. Dürig, D. W. Pohl, F. Rohner, *Near-field optical-scanning microscopy*, J. Appl. Phys., Vol. 59, No. 10, 15 May 1986, pp. 3318–3327.

D. Courjon, J. M. Vigoureux, M. Spajer, K. Sarayeddine, S. Leblanc, *External and internal reflection near field microscopy: experiments and results*, Applied Optics, Vol. 29, No. 26, 10 Sep. 1990, pp. 3734–3740.

R. C. Reddick, R. J. Warmack, D. W. Chilcott, S. L. Sharp, T. L. Ferrell, *Photon scanning tunneling microscopy*, Rev. Sci. Instr., Vol. 61, No. 12, Dec. 1990, pp. 3669–3677.

E. Betzig, J. K. Trautman, *Near-Field Optics: Microscopy, Spectroscopy, and Surface Modification Beyond the Diffraction Limit*, Science, Vol. 257, 10 Jul. 1992, pp. 189–195.

The classical scanning near-field optical microscope (SNOM) employs a tiny aperture with an entrance pupil diameter small with respect to the wavelength of the light used for illuminating the object to be inspected. Directed at the aperture is a laser beam of which a minute part passes to impact the surface of the object. If the object is placed from the aperture at a distance which is also small compared to the wavelength, that is, in the near-field, the light reflected by, or transmitted through, the object can be collected and processed to yield an image of the surface investigated. Presently, SNOMs reach solutions of about $\lambda/20$ with visible light.

The basis of operation of the conventional scanning tunneling optical microscope (STOM)—as described in the Courjon et al. reference and also known under the name photon scanning tunneling microscope, as described in the above-cited Reddick et al. reference,—is the sample-modulated tunneling of normally internally reflected photons to a sharply pointed optically transparent tip. The source of the photons is the evanescent field produced by the total internal reflection of a light beam from the sample surface. Thus, spatial variations in the evanescent field intensity form the basis for imaging. They essentially provide an exponentially decaying waveform normal to the sample surface. Photons tunneling from the total internal reflection surface to the tip are guided to a suitable detector which converts the light flux to an electrical signal.

This corresponds to the electron wave function inside a tunneling barrier, as it is known from scanning electron tunneling microscopy. And, as in electron tunneling, the number of photons reaching the detector sensitively depends on the distance between tip and sample surface. However, while as a matter of fact all known conventional photon tunneling microscopes operate with air (or possibly vacuum) in the gap between tip and sample surface, the present invention contemplates the filling of the gap with a denser medium than air, viz. with a liquid. Although within the scope of the invention several different liquids may be employed for filling the gap, such as pigmented solutions or oil, for example, the description of the invention hereafter to follow will concentrate on liquids with extreme attenuation characteristics: liquid metals.

Accordingly, the invention in particular relates to scanning near-field optical microscopes of the type where a light beam with a diameter of about $\lambda/20$ or less is emitted/received by a sharply pointed probe tip which is scanned across the surface of a sample to be investigated, and where the light reflected by, and/or transmitted through, said sample is recorded and/or further processed, and where the distance between the light-emitting, or light-receiving probe tip and the surface under investigation is on the order of $\lambda/20$ as well, so that said surface is within the near-field of said probe tip, and this optical microscope is characterized in that the gap between said probe tip and said sample is filled with an optically attenuating liquid, in particular with a liquid of high opacity, in particular with a large negative dielectric constant $\epsilon$ so as to attenuate the intensity of the lightwaves emitted, or received, by said probe tip to such an extent that the penetration depth $z_0$ of the lightwaves, defined as the distance over which their intensity decreases to $1/e$, is below 100 nm.

Details of two preferred embodiments of the invention will hereafter be described by way of example and with reference to the drawings in which:

FIG. 1 is a diagram showing the electron tunneling through an insulator (I) barrier;

FIG. 2 is a diagram showing the photon tunneling through a metal (M) barrier between transparent dielectric materials (I);

FIG. 3 shows the scheme of the scanning near-field optical microscope in accordance with the invention;

FIGS. 4 to 6 depict three possibilities for liquid metal application;

Figure 7:
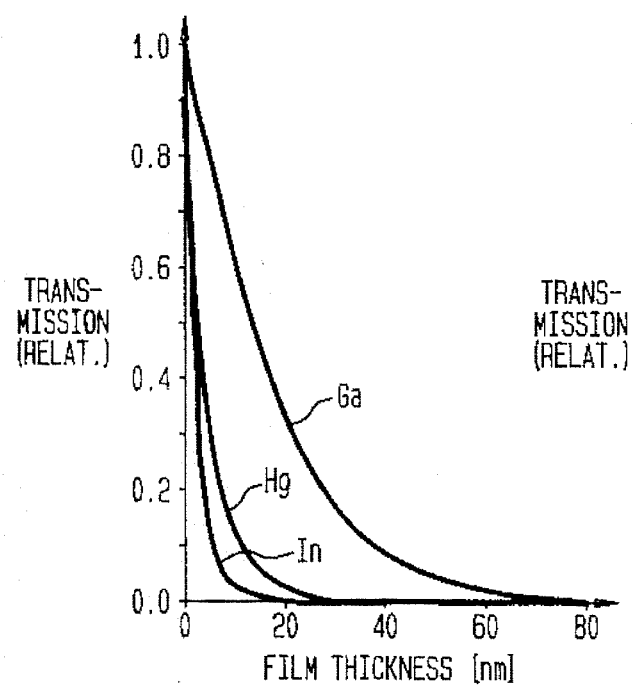
Figure 8:
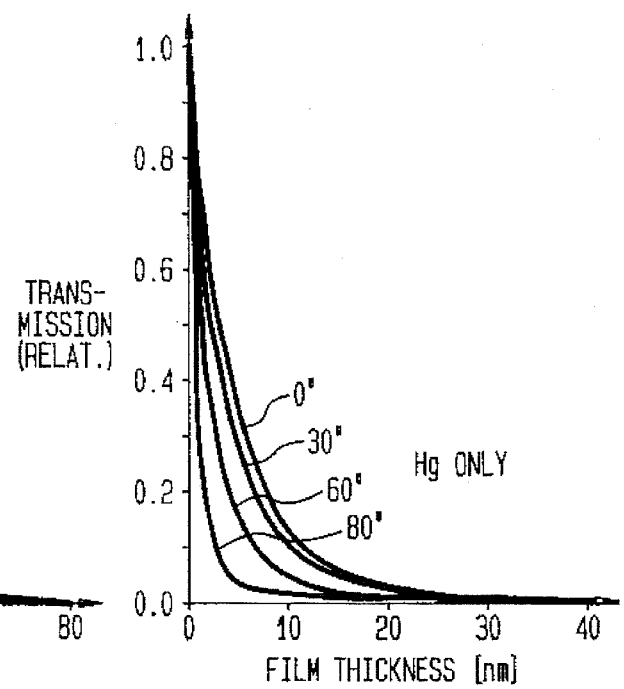
Figure 9:
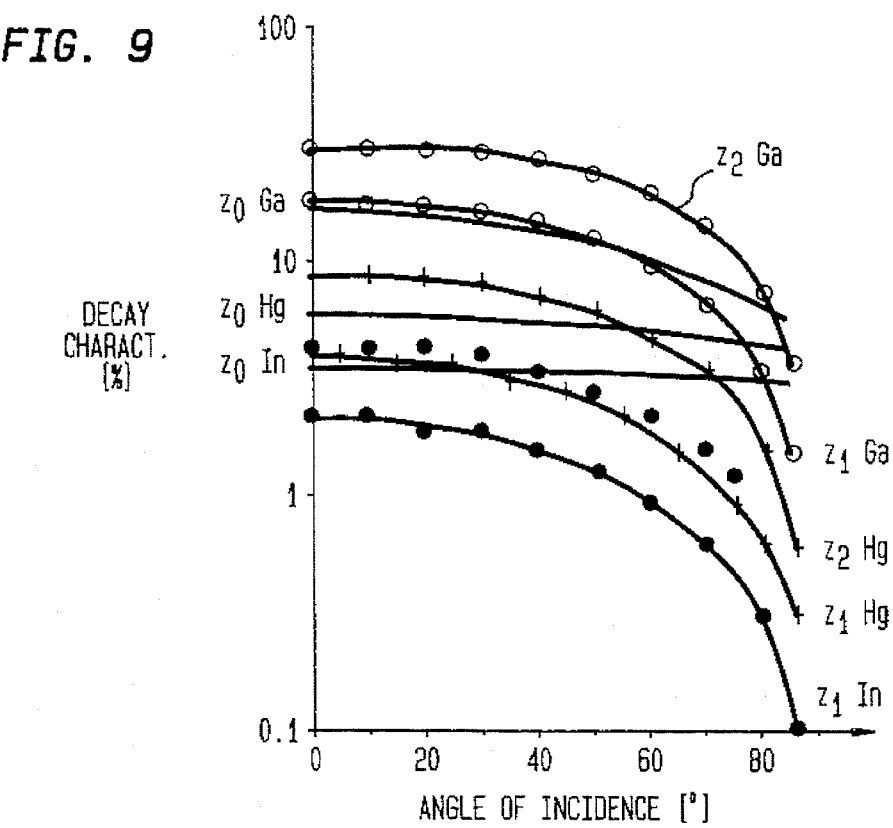
Figure 10:
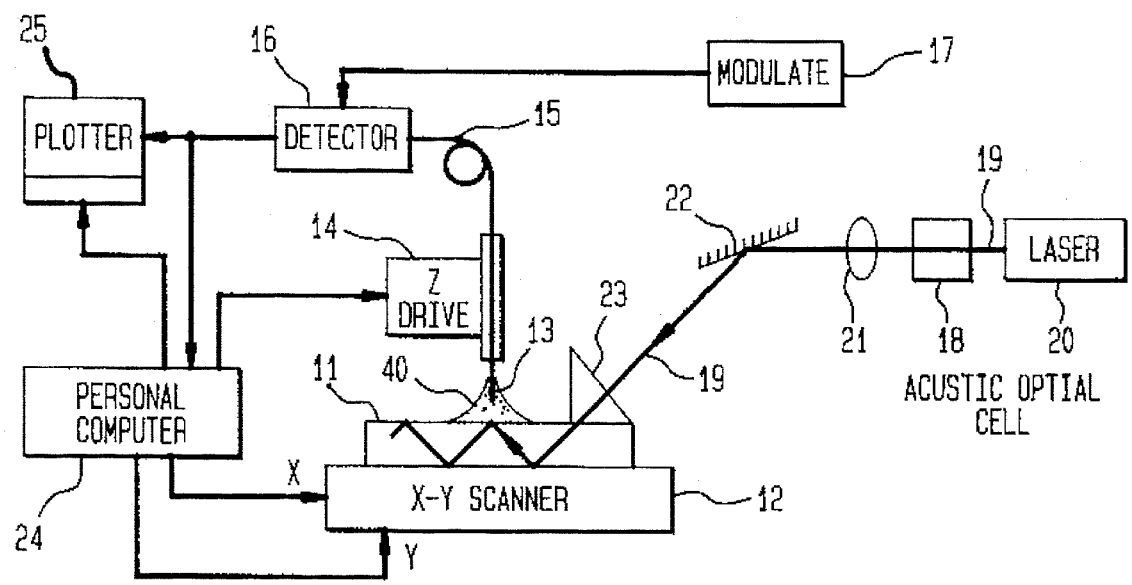
Figure 11:
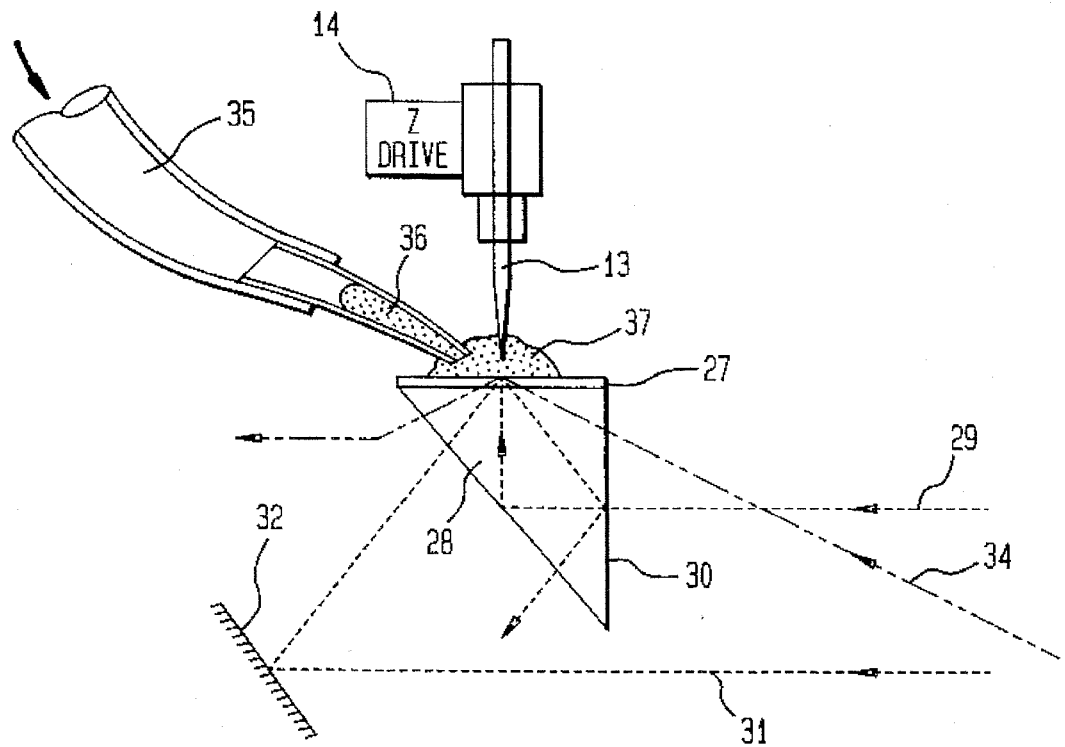
Figure 12:
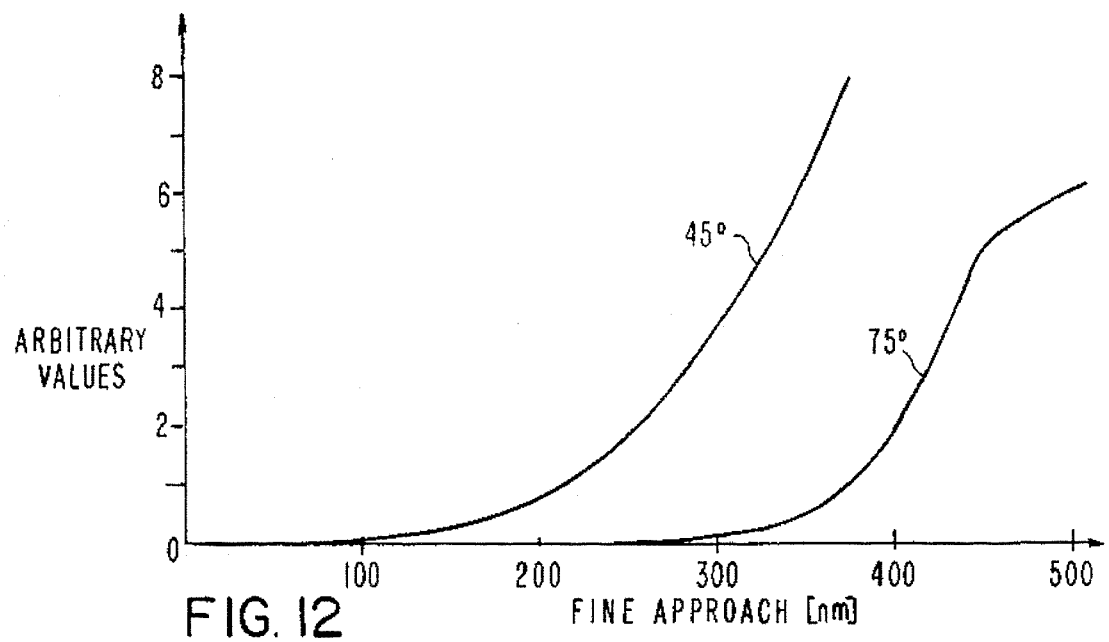
Figure 13:
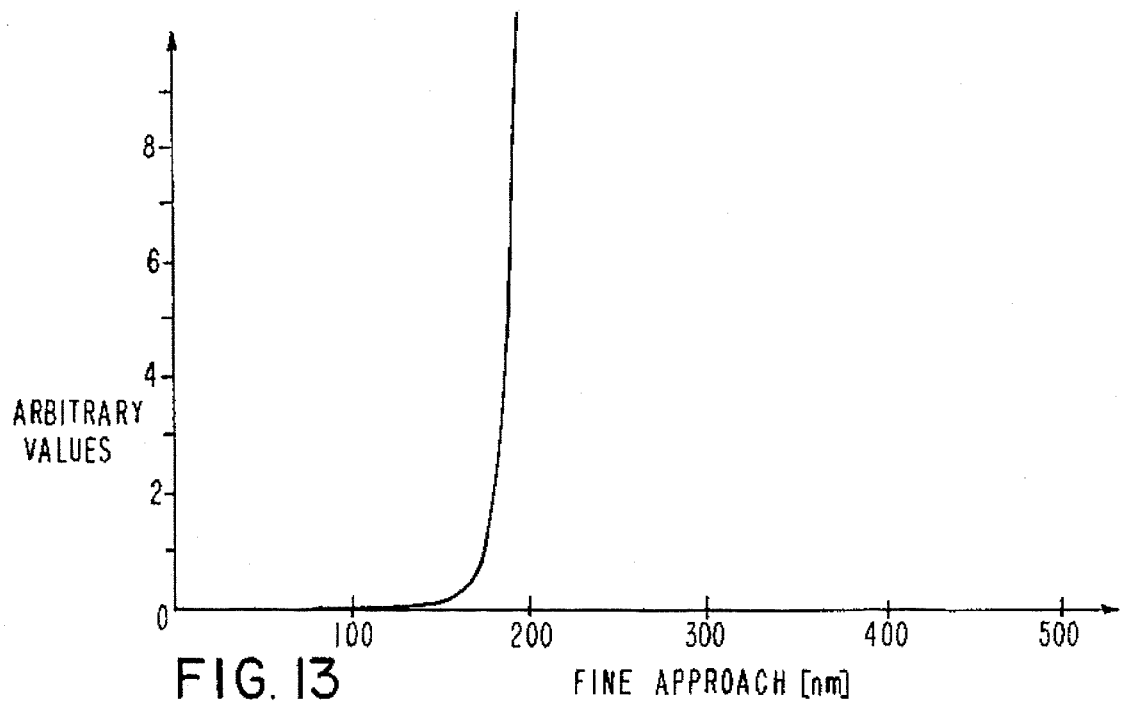

FIGS. 7 and 8 respectively show transmission characteristics of various metals and for various impingement angles for mercury;

FIG. 9 a diagram showing the characteristic decay lengths for several metals;

FIG. 10 illustrates a first embodiment of the invention;

FIG. 11 schematically shows a second embodiment of the invention;

FIG. 12 is a diagram showing the decay length of a conventional STOM type scanning near-field optical microscope with an air/vacuum gap;

FIG. 13 is a diagram showing the decay length of the scanning near-field optical microscope with a liquid-metal-filled gap in accordance with the invention.

The capability to tunnel across some kind of potential barrier is common to any form of wave-like propagation. Inside the potential barrier, the amplitude of the probability function evanesces, typically in an exponential way. This phenomenon has been employed in the well-known scanning electron tunneling microscope, and it is a well applicable in connection with scanning photon tunneling microscopes. For electrons, the simplest tunnel barrier is a gap between two metallically conducting pieces, forming an "MIM" junction (M standing for the metallic conductor, and I for the insulating gap). Thus, $$V_{(z)} - E > 0 \text{ (metal)}, \quad V_{(z)} - E < 0 \text{ (gap)}, \qquad [1]$$

where z is the direction of propagation, $V_{(z)}$ the potential, and E the energy of the electron. Reference is made to FIG. 1. This is obvious to those skilled in the art from the stationary Schrödinger equation, respectively its Fourrier transform:

$$-\frac{\hbar^2}{2m}(k_x^2 + k_y^2 + k_z^2)\psi + [E - V_{(z)}]\psi = 0 \qquad [2]$$

where $\hbar$ is the Dirac-h, m the mass of the electron, $K_{x,y,z}$ are the wave vector amplitude components in Cartesian coordinates, $\psi$ is the probability. The form of the electromagnetic wave equation corresponding to Eq. [2] with the electric field $\vec{E}$ is:

$$-(k_x^2 + k_y^2 + k_z^2)\vec{E} + \epsilon(z)k_0^2\vec{E} = 0 \qquad [3]$$

where $k_0 \equiv \omega_0/c_0$, with $\omega_0$, $c_0$ and $\epsilon(z) = n^2(z)$ being respectively the frequency of oscillation, the vacuum velocity of light, and the dielectric constant of the barrier material, which equals the square of the respective refractive index n. The simplest implementation of an optical tunnel barrier is a metal film with negative $\epsilon$ between two pieces of a transparent medium having an $\epsilon > 0$, thus an "IMI" junction as represented by FIG. 2.

In order to evanesce in the direction of propagation, chosen to be z, it is necessary that $k_z$ have a strong imaginary component, hence:

$$\text{Re } k_z^2 < 0 \qquad [4]$$

requiring that $$q^2 - (k_x^2 + k_y^2) < 0, \qquad [5]$$

where, with $V_B$ and $\epsilon_B$ standing respectively for the barrier potential and the dielectric constant, $$q^2 = 2\frac{m}{\hbar}[E - V_B] \qquad [6a]$$

for electrons, and $$q^2 = \epsilon_B k_0^2 \qquad [6b]$$

for photons. Substituting Eq. [6b] into Eq. [5] yields:

$$\epsilon_B h_0^2 - (k_x^2 + k_y^2) < 0. \qquad [7]$$

Eq. [7] can be satified is two ways:
1. Making $k_x$, $k_y$ very large.
   This was chosen for the scanning optical tunneling microscopes (STOM) designed up to now. The STOM technique is convenient but limited as concerns the achievable resolution, and restricted to illumination at oblique incidence, which places certain limitations on the sample geometry.
2. Selecting a barrier material with Re $\epsilon_B < 0$.
   This way is chosen for the present invention by filling the gap between the transparent probe tip and the sample surface with a metallic liquid having a large negative dielectric constant, see FIG. 3. In view of the small gap width involved, the actual filling existing between tip and surface can be considered as a very thin film.

An optical wave passing through a thin metallic film is heavily attenuated. The penetration depth $z_0$ (defined as the 1/e intensity decay length) for the photons typically is $z_0 = 5 \ldots 20$ nm for good metals and normal incidence. However, in accordance with classical optical theory (FIG. 9), values as small as 2 nm may be achieved for large angles of incidence. The small depth is used in the present invention to achieve extreme sensitivity of the scanning near-field optical microscope disclosed herein.

While of course optical waves are attenuated also in a solid-state metallic film (as it may be deposited on the surface to be inspected), the invention preferably uses liquid metal thin films for two obvious reasons: (1) There is no danger involved that the tip might be damaged as it is approached to the thin film, and (2) the effective thickness of the thin film can be varied in a continuous way. The optical transmissivity of the gap can, therefore, be adjusted to a preset value.

The thickness of film 1 of the liquid metal 9 (FIG. 3) between the apex 2 of tip 3 and the surface 4 of the sample 5 may be chosen so that the path of transmission of a light beam 6 impinging at surface 4 is restricted laterally to a narrow region 7 next to the apex of tip 3. The transmitted beam 8 entering the body of tip 3 hence carries information on the interaction zone, i.e., the tunnel region 7, which can be converted into electrical signals by a suitable photodetector. It is also possible to invert the direction of the light, sending it into tip 3 at the far side thereof, and picking it up at the sample side as indicated by the arrow heads on FIG. 3 in phantom. Further, the gap width-dependent change may be observed in reflection mode rather than in transmission mode, thus extending the technique of the invention to the study of opaque objects.

The lateral resolution of a SNOM or of an STM approximately equals the the decay length. With a decay length $z_0$ of 2 . . . 10 nm, the lateral resolution of a SNOM with liquid-metal gap filling hence comes into the range of molecular structures. When exploiting the capability of laser light to modify materials, signatures. When exploiting the capability of laser light to modify materials, signatures of that size may be created. This bears potential for optical storage with sub-10 nm bitsize.

Liquid metal as gap filling provides for reproducible gap deformation. Several metals, in particular alloys, are known to be liquid at or near room temperature. Examples are: Indium/gallium eutectic alloy with a melting point at 15.7° C., indium/mercury alloys with up to 70% indium, or pure gallium with a melting point at 29° C., or pure mercury. For more information on liquid metals, reference is made to M. Hansen and K. Anderko, *Constitution of Binary Alloys*, McGraw-Hill Book Company, Inc., New York 1958, in particular pp. 745–747.

In order to maintain a stable fluid film between tip and sample surface, even at very small gap widths, it is necessary that the liquid metal wet tip and/or sample surface, at least to a certain extent. The properties of Ga/In alloy are favorable in this respect, in contrast to pure mercury, since clean dry surfaces of glass and similar materials, such as freshly cleaved mica, are readily wetted. Also, metallized surfaces are wetted without a problem. It is, therefore, recommendable to coat the tip with a thin metal film, such as gold or chromium, for example. The stability of the fluid film can further be improved by pressure. To this end, probe tip 3, 13 and sample 5, 11, 27 may be enclosed within a pressure chamber (not shown in the drawings) enabling the application of hydrostatic pressure in the gap between probe tip and sample.

The wetting requirement imposes restrictions on a manifold of surfaces that could be investigated in accordance with the technique of the invention. However, there is a large variety of surface preparation techniques available to achieve wettability, and also the variety of liquid metals is very large, if one allows for ternary and more complicated compositions, and if one can accept somewhat elevated melting temperatures, say up to about 300° C., for example.

The liquid metal can be applied at the interaction region of the scanning near-field optical microscope in several ways. Three possibilities are depicted in FIGS. 4 to 6:

1. A droplet 10a of the liquid metal is deposited on the sample surface in juxtaposition to the tip. The droplet can be forced to spread over the gap region by sufficiently increasing its size, and/or by pushing it towards the tip (FIG. 4).

2. A film 10b of liquid metal is deposited on the sample surface prior to approaching the tip. Vacuum deposition techniques, such as evaporation or sputtering, are favored since they permit the deposition of films with well-defined thicknesses (FIG. 5).

3. A film 10c of liquid metal is deposited on the surface of the tip prior to the sample approach. While vacuum deposition may again be the best choice, simple dipping of the tip might be sufficient, provided the tip was properly prepared beforehand.

The approximate dielectric constants $\epsilon$ (at 1.5 to 2.0 eV) and the resulting penetration depths $z_0$ for the liquid metals are indicated below:

| Metal | $\epsilon$ | $z_0$ | Reference |
|---|---|---|---|
| Gallium | −10 − i15 | 15 @ nm | (a) |
| Indium | −100 + i30 | 7 @ nm | (b) |
| Mercury | −30 + i30 | 10 nm | (c) |

Ga/In alloys and In/Hg alloys are expected to have optical constants in between those of gallium and indium, and between indium and mercury, respectively. The optical properties of of the gallium/indium eutectic should closely resemble those of mercury. The literature references indicated above are the following:

(a)@@R. Kofman, P. Cheyssac, J. Richard, *Optical Properties of Ga Monocrystal in the 0.3 . . . 0.5 eV Range*, Phys. Re. B 16 (1977) pp.@5216–5223.

(b)@@R. Y. Koyama, N. W. Smith, W. E. Spicer, *Optical Properties of Indium*, Phys. Rev. B 8 (1973) pp. 2426–3432.

(c)@@T. Inagaki, E. T. Arakawa, M. W. Williams, *Optical Properties of Liquid Mercury*, Phys. Rev. B 23 (1981) pp. 5246–5262.

The transmission of an IMI junction, i.e., of a thin metal film sandwiched between two flat layers, can be calculated on the basis of the well-known theory of optics of metals. Reference is made to M. Born, E. Wolff: *Principles of Optics*, Pergamon Press, London 1959, in particular Chapter 13.4 Eq. (24). This equation provides an approximation only to the tip/sample arrangement, because of the strong curvature of the apex. But this is good enough for semi-quantitative predictions, since fairly good agreement exists with the experimental data now available.

FIG. 7 shows the calculated transmission characteristics as a function of thickness for gallium, indium and mercury at normal incidence of the light beam. The finite imaginary parts of $\epsilon$ are included in these calculations. They cause a sinusoidal modulation superimposed on the exponential decay. Yet this modulation is too long-wave for it to be visible as an ondulation of the curves. The decay lengths are approximately 20, 4, and 8 nm for gallium, indium and mercury, respectively. As one would expect, the transmissivity falls off still more abruptly at oblique incidence, as shown in FIG. 8 for mercury.

The decay is not strictly exponential, in particular not so at very small gap width. The decay length obtained from an exponential fit hence is not necessarily suited for practical applications where the transmissivity range between 10% and 90% is of special interest, for example. Three characteristic parameters are, therefore, presented in FIG. 9 for each of the three metals, namely, the inverse decay constant $z_0$, the 1/e gap width $z_1$, and the $1/e^2$ gap width $z_2$. As can be seen from the diagram, there are sizeable differences between $z_0$ and $z_1$ as well as between $z_2$ and $2z_1$.

A first embodiment of the invention is shown in FIG. 10 which to a large extent resembles FIG. 4 of a paper by K. Sarayeddine et al., "*Scanning Tunneling Optical Microscopy (STOM) Using a Stylus Sensor Application to Topography Analysis of Guiding Surfaces*", SPIE Vol. 1139, Optical Storage and Scanning Technology (1989) pp. 68–72. In FIG. 10, the sample 11 is supported on an x-y-scanner 12 for movement in x- and y-directions with respect to a probe tip 13 which for its part is mounted to a z-drive 14 for vertical movement with respect to the surface of sample 11. Tip 13 can, for example, consist of the sharply pointed end of an optical glass fiber 15 the far end of which is connected to a synchronous detector 16. The latter receives an input signal from a modulator 17 which also controls an acousto-optical cell 18 which in turn controls the laser beam 19 which is continuously emitted by a laser 20. Laser beam 19 is passed through a lens 21, deflected by a mirror 22 and impinges on the surface of sample 11 after passing a prism 23, x-y-scanner 12 and z-drive 14 receive control signals from a personal computer 24 which in turn is controlled by said synchronous detector 16, and which generates an output image on a plotter 25.

The important difference of the arrangement in accordance with the invention as shown in FIG. 10 is that tip 13 dips into a droplet of liquid metal 40 which, thus, fills the entire gap between tip 13 and the surface of sample 11, whereas the Sarayeddine et al. reference does not suggest anything to fill the gap but air.

While in the embodiment of FIG. 10, the laser beam 19 enters the sample 11 at a fixed angle, more flexibility is obtained with the second embodiment shown in FIG. 11 where the sample 27 to be investigated is attached to a 90° glass prism 28. If a laser beam 29 is directed at the vertical flank 30 of prism 28, it will impinge normal at the surface of (transparent) sample 27. With the laser beam 31 directed via mirror 32 at the 45° flank of prism 28, there will be 45° impingement, and with laser beam 34 having an oblique direction, the impingement will be under an angle of 75°. The laser may be of any or a diode laser, for example. Except for the way of guiding the laser beam, the two embodiments of the invention are equivalent.

Without application of the liquid metal film, both embodiments can be operated in the conventional STOM-mode: The pointed tip 13 is coarsely approached to the sample by a motor-driven micrometer screw (not shown in the figures) and then finely approached by means of z-drive 14 until the apex of tip 13 enters the evanescent field produced by the respective one of laser beams 19, 29, 31 and 34 hitting the sample surface at an angle exceeding the critical angle for total reflection ($\cong 42°$ for glass). The optical fiber converts some of the evanescent wave into a propagating wave and guides it to synchronous detector 16 (which can be a conventional photomultiplier) for detection.

During operation without liquid metal filling, i.e., with an air gap, the detected flux varies nearly exponentially with the distance between tip 13 and the surface of sample 11. FIG. 12 shows the flux/distance relationship for the embodiment of FIG. 11 for beam incidences of 45° and 75° (laser beams 31 and 34, respectively). The corresponding experimental decay lengths are 100 nm and 40 nm, respectively. It has been found that only insignificant changes in decay length occur as the angle of incidence is increased towards 90°. It is to be noted that in this figure, the abscissa has its origin in an arbitrary point where the fine approach of tip 13 towards sample 27 commences.

In accordance with the present invention, a thin film of liquid metal fills the gap between tip 13 and sample 27, FIG. 11. The application of the metal film may, for example, be made with a pipette 35 into which some liquid metal 36 has been sucked. Through the application of pressure, say with a hand balloon (not shown), a droplet 37 of the metal can be positioned right on the spot where tip 13 approaches the surface of sample 27. In order to establish a stable metal layer between tip and surface, it is important to avoid oxidation/corrosion while droplet 37 starts filling the gap. Wetting is promoted by careful cleaning and drying, reduction of air humidity, and by thin adhesive metal coatings, such as a hue of chromium and/or gold on the sample surface and/or the tip surface.

As mentioned before, a variety of liquid metals is available for filling the gap. The diagram of FIG. 13 was generated with the apparatus of FIG. 11 with liquid Ga/In eutectic alloy as the gap filling, and with normal incidence of laser beam 29. The flux-over-distance relation yields a decay length of about 7.5 nm, which is a factor of 5 to 15 improvement over the metalless arrangement. Again, the origin of the abscissa corresponds to an arbitrary point where the fine-approach was started. This point is, however, unrelated to the starting point for FIG. 12.

In addition, the SNOM microscopy can be conducted at any angle of incidence, in particular in the normal direction which is essential for certain imaging problems.

Scan images of the sample surface can be created with the instrument of the present invention by rastering the sample 27 with tip 13 either at constant distance or at constant flux of photons. Topographic and optical surface features show up in the respective other parameter of the pair, i.e., as flux or position variations. The lateral resolution obtained with scanning tunneling optical microscopes in general is a fraction only of the decay length, indicating that the assumption resolvable lateral details≡decay length is a fairly conservative one.

On the basis of the wealth of experience with the STM and with the conventional STOM, the observed distance relation allows the prediction of a lateral resolution in the range of 5 to 10 nm with good changes of undercutting by a factor of 2 to 3, thus resulting in a resolving power of 2 . . . 5 nm. This will open the door to optical studies of individual molecules and even atoms on a solid surface.

The concept of using a liquid metal as a potential barrier for tunneling photons has also other applications not directly related to microscopy. For example, the concept may be applied to optical storage units where the storage medium and/or the probe tip is covered with a thin layer of liquid metal. With the resulting increase in resolving power, it will be possible to reduce the size of the individual information bits to below 10 nm, thus dramatically increasing the overall storage capacity.

Another possible application is seen in connection with optical circuit elements, such as modulators, couplers and switches. For example, a conventional optical coupler consists of two optical fibers placed in juxtaposition, with their claddings partly removed in the region of contact. The coupling factor of this coupler can be made adjustable by placing a thin layer of liquid metal between the fibers in their region of contact, and by varying the thickness of the metal layer with external adjustment means, or even with the aid of the optical waves travelling along these fibers.

We claim:

1. A scanning near-field optical microscope of the type where a light beam with a diameter of at maximum $\lambda/20$ is emitted by a sharply pointed probe tip and scanned across the surface of a sample to be investigated, and the light reflected by and/or transmitted through said sample is detected and further processed, and where the distance between the light-emitting probe tip (3; 13) and the sample under investigation is on the order of $\lambda/20$ as well, so that the surface of said sample is within the near-field of said light-emitting probe tip comprising a gap between said probe tip and said sample filled with a liquid of high opacity, including any liquid having a large negative dielectric constant $\epsilon$, so as to attenuate the intensity of the lightwaves emitted by said probe tip to such an extent that the penetration depth $z_0$ of the lightwaves, defined as the distance over which their intensity decreases to 1/e, is below 100 nm.

2. A scanning near-field optical microscope of the type where a light beam with a diameter of at maximum $\lambda/20$ is received by a sharply pointed probe tip which is scanned across the surface of the sample to be investigated, and the light transmitted through said sample is detected and further processed, and where the distance between the light-receiving probe tip and the sample under investigation is on the order of $\lambda/20$ as well, so that the surface of said sample is within the near-field of said probe tip comprising a gap between said probe tip and said sample is filled with a gap filling liquid of high opacity, including any liquid having a large negative dielectric constant $\epsilon$ as to attenuate the intensity of the lightwaves received by said probe tip to such an extent that the penetration depth $z_0$ of the lightwaves, defined as the distance over which their intensity decreases to 1/e, is below 100 nm.

3. A scanning near-field optical microscope in accordance with claim 1 or 2, wherein said gap-filling liquid is a metal which is liquid at normal room temperature.

4. A scanning near-field optical microscope in accordance with claim 1 or 2, wherein said gap-filling liquid is a metal which is liquid at a temperature below 300° C.

5. A scanning near-field optical microscope in accordance with claim 3, wherein said gap-filling liquid is selected from the group consisting of gallium, indium, mercury and their alloys.

6. A scanning near-field optical microscope in accordance with claim 3, wherein said gap-filling liquid is a ternary or higher composition comprising at least one member of the group consisting of gallium, indium, and mercury.

7. A scanning near-field optical microscope in accordance with claim 1 or 2, wherein said probe tip and/or said sample surface are wetted by said gap-filling liquid.

8. A scanning near-field optical microscope in accordance with claim 7, wherein said probe tip and/or said sample surface are covered with a thin solid metal layer for improved wettability.

9. A scanning near-field optical microscope in accordance with claim 8, wherein said probe tip and/or said sample surface are covered with a thin layer of metal selected from the group consisting of gold and chromium.

10. A scanning near-field optical microscope in accordance with claim 2, wherein said light beam received by said probe tip is guided so as to impinge onto said sample surface under an angle larger than the angle for total internal reflection of the material of which the sample is composed.

11. A scanning near-field optical microscope in accordance with claim 10, wherein said impingement angle corresponds to normal incidence.

12. A scanning near-field optical microscope in accordance with claim 2, wherein said light beam received by said probe tip is guided so as to impinge onto said sample surface under an angle smaller than the angle for total internal reflection of the material of which the sample is composed.

13. A scanning near-field optical microscope in accordance with claim 1 or 2, wherein said probe tip and sample are enclosed by a pressure chamber enabling the application of hydrostatic pressure for stabilizing the liquid metal film in the gap between probe tip and sample.

\* \* \* \* \*